United States Patent
Wei et al.

(10) Patent No.: US 10,133,666 B2
(45) Date of Patent: Nov. 20, 2018

(54) FILE STORAGE METHOD AND APPARATUS

(71) Applicant: Huawei Technologies Co., Ltd., Shenzhen, Guangdong (CN)

(72) Inventors: Mingchang Wei, Shenzhen (CN); Wei Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 834 days.

(21) Appl. No.: 13/709,988

(22) Filed: Dec. 10, 2012

(65) Prior Publication Data

US 2013/0103920 A1 Apr. 25, 2013

Related U.S. Application Data

(63) Continuation of application No. PCT/CN2012/071914, filed on Mar. 5, 2012.

(30) Foreign Application Priority Data

Mar. 21, 2011 (CN) .......................... 2011 1 0067421

(51) Int. Cl.
  G06F 7/487 (2006.01)
  G06F 12/06 (2006.01)
  (Continued)

(52) U.S. Cl.
  CPC .......... G06F 12/0646 (2013.01); G06F 3/067 (2013.01); G06F 3/0613 (2013.01); G06F 3/0667 (2013.01); G06F 17/30091 (2013.01)

(58) Field of Classification Search
  CPC ............. G06F 17/30067; G06F 3/0643; G06F 17/30233; G06F 17/30091; G06F 3/0667;
  (Continued)

(56) References Cited

U.S. PATENT DOCUMENTS 5,375,233 A    12/1994 Kimber et al.
7,055,014 B1 *  5/2006 Pawlowski et al. .......... 711/202
(Continued)

FOREIGN PATENT DOCUMENTS

CN    1229485 A    9/1999
CN    101039278 A  9/2007
(Continued)

OTHER PUBLICATIONS

Won et al., "Hermes: Embedded File System Design for A/V Application," *Multimedia Tools and Applications*, issue 39, pp. 73-100, Springer Science + Business Media LLC (2008).
(Continued)

*Primary Examiner* — David Yi
*Assistant Examiner* — Candice Rankin
(74) *Attorney, Agent, or Firm* — Leydig, Voit & Mayer, Ltd.

(57) ABSTRACT

A file storage method includes: splitting each of multiple files into one or more file block objects with different sizes; and writing the file block objects obtained from file splitting into corresponding large object storage files, wherein a preset number of large object storage files are pre-created in a storage apparatus, and storage spaces occupied by the preset number of large object storage files in the storage apparatus are continuous.

14 Claims, 5 Drawing Sheets

(51) Int. Cl.
*G06F 17/30* (2006.01)
*G06F 3/06* (2006.01)

(58) Field of Classification Search
CPC ............ G06F 12/0866; G06F 12/0246; G06F 17/30194; G06F 17/30159; G06F 17/30215; G06F 3/064; G06F 3/0685; G06F 12/0238; G06F 17/30221; G06F 2212/205; G06F 2212/214; G06F 3/0683; G06F 3/0689; G06F 2212/7202; G06F 17/3053; G06F 2212/502; G06F 3/067; G06F 3/0688; G06F 3/0644; G06F 3/0679; G06F 2201/80; G06F 2212/7204; G06F 9/5077; G06F 2212/652; G06F 3/0631

See application file for complete search history.

(56) References Cited

U.S. PATENT DOCUMENTS

| | | | | |
|---|---|---|---|---|
| 8,275,750 | B2 * | 9/2012 | Bhandiwad | G06F 17/30073 707/661 |
| 9,317,213 | B1 * | 4/2016 | Gupta | G06F 3/064 |
| 2002/0174294 | A1 * | 11/2002 | Tamura | 711/113 |
| 2007/0156997 | A1 * | 7/2007 | Boule et al. | 711/170 |
| 2007/0239957 | A1 * | 10/2007 | Lin | 711/170 |
| 2011/0099326 | A1 * | 4/2011 | Jung et al. | 711/103 |
| 2011/0145538 | A1 * | 6/2011 | Yoshioka | G06F 3/0608 711/171 |
| 2011/0238933 | A1 * | 9/2011 | Fujimoto | 711/154 |

FOREIGN PATENT DOCUMENTS

| | | |
|---|---|---|
| CN | 101515253 A | 8/2009 |
| CN | 101888405 A | 11/2010 |
| CN | 102096722 A | 6/2011 |
| EP | 0927934 A1 | 7/1999 |
| EP | 2339471 A1 | 6/2011 |
| WO | WO 2010021085 A1 | 2/2010 |

OTHER PUBLICATIONS

Evans, Jason, "A Scalable Concurrent malloc(3) Implementation for FreeBSD," <freebsd.org> (Apr. 16, 2006).
First Office Action in corresponding Chinese Patent Application No. 201110067421.2 (dated Jan. 6, 2012).
International Search Report in corresponding PCT Patent Application No. PCT/CN2012/071914 (dated Apr. 19, 2012).

* cited by examiner

| File1 | File 2 | File 3 | File 4 | File 5 ||
| File 8 | File 6 | File 7 | File 9 | File 10 | File 2 | large object storage files in the storage apparatus are continuous.

FILE STORAGE METHOD AND APPARATUS

CROSS-REFERENCE TO RELATED APPLICATIONS

This application is a continuation of International Patent Application No. PCT/CN2012/071914, filed Mar. 5, 2012, which claims priority to Chinese Patent Application No. 201110067421.2, filed on Mar. 21, 2011, both of which are hereby incorporated by reference in their entireties.

FIELD

The present disclosure relates to the field of storage technologies, and in particular, to a file storage method and apparatus.

BACKGROUND

The software system responsible for managing and storing file information in an operating system is called a file management system, which is briefly known as a file system. From the perspective of the system, a file system is a system for organizing and allocating file storage space (for example, a hard disk, a disk or a partition), storing files, and protecting and retrieving stored files. Specifically, the file system is responsible for creating a file for a user, storing, reading, modifying and dumping files, controlling file access, and canceling the file when the user does not use it any longer.

Before being used as a file system, a disk or partition needs to be initialized, and the recorded data structures need to be written onto the disk. This process is referred to as creating a file system. After the file system is created, the storage space of the disk or partition is divided into multiple file system blocks (that is, disk space blocks) of a specific size for storing files.

Currently, when writing files, the file system allocates file system blocks to each of the files independently to store the file. As shown in FIG. 1, for the purpose of storing a file, more file system blocks are allocated to a large file (that is, a file of a larger size), and fewer file system blocks are allocated to a small file (that is, a file of a smaller size). At the time of writing files with different sizes, the files are written into positions of the file system blocks allocated to the files respectively. Moreover, the positions of the file system blocks allocated to the files are random, and therefore, the write positions of the files are irregular.

In some scenarios such as a cloud storage system, a file system needs to store massive files with different sizes. When the file system processes massive files with different sizes, especially massive small files, because the write positions of the massive files with different sizes are irregular, when the file system writes massive files with different sizes, the magnetic head keeps moving from one position to another. It takes a long time to move the magnetic head position, which seriously affects the write speed of the file system and leads to poor write performance of the file system.

SUMMARY

Embodiments of the present invention provide a file storage method and apparatus to overcome at least the problem of poor write performance when a file system writes massive files with different sizes in the prior art.

In one aspect, a file storage method is provided, which includes: splitting each of multiple files into one or more file block objects with different sizes; and writing the file block objects obtained from file splitting into corresponding large object storage files, wherein a preset number of large object storage files are pre-created in a storage apparatus, and storage spaces occupied by the preset number of large object storage files in the storage apparatus are continuous.

In another aspect, a file storage apparatus is provided, which includes: a storage module configured to store files, where a preset number of large object storage files are created in the storage module, and storage spaces occupied by the preset number of large object storage files in the storage module are continuous; a splitting module configured to split each of multiple files into one or more file block objects with different sizes; and a writing module configured to write the file block objects obtained by file splitting into corresponding large object storage files.

In further another aspect, a storage device is provided, which includes: a computer readable storage medium configured to store files; and a storage controller configured: create a plurality of large object storage files on the computer readable storage medium, wherein storage spaces of the plurality of large object storage files are continuous, the sizes of the plurality of large object storage files correspond to different size levels; split a file into a plurality of file block objects with different sizes; write the plurality of file block objects into the same number of large object storage files whose size levels correspond to the sizes of the plurality of file block objects respectively.

In some embodiments of the present invention, a splitting and aggregation mode is applied. Each of the massive files with different sizes is split into one or more file block objects, and then the massive file block objects obtained from file splitting are written into corresponding large object storage files pre-created in a storage apparatus, for example, a disk. The number of large object storage files in the storage apparatus is fixed and the storage spaces are continuous. Therefore, the massive files with different sizes are aggregated (combined) into the fixed number of large object storage files. Because the number of large object storage files in the storage apparatus is fixed and the storage spaces are continuous, the massive files with different sizes are ultimately written into fixed number of large object storage files in relative order, thereby improving the write performance of the file system in storing massive files with different sizes.

BRIEF DESCRIPTION OF THE DRAWINGS

To illustrate the technical solutions in the embodiments of the present invention more clearly, the following briefly describes the accompanying drawings required for describing the embodiments or the prior art. Apparently, the accompanying drawings in the following description merely show some embodiments of the present invention, and persons of ordinary skill in the art can derive other drawings from these accompanying drawings without creative efforts.

DETAILED DESCRIPTION OF THE EMBODIMENTS

To make the objectives, technical solutions and advantages of the present invention more comprehensible, the following describes the present invention in detail with reference to the accompanying drawings and embodiments. It should be understood that the embodiments described herein are merely for the illustration of the present invention, and is not intended to limit the present invention.

Embodiment 1

Figures 1, 2:
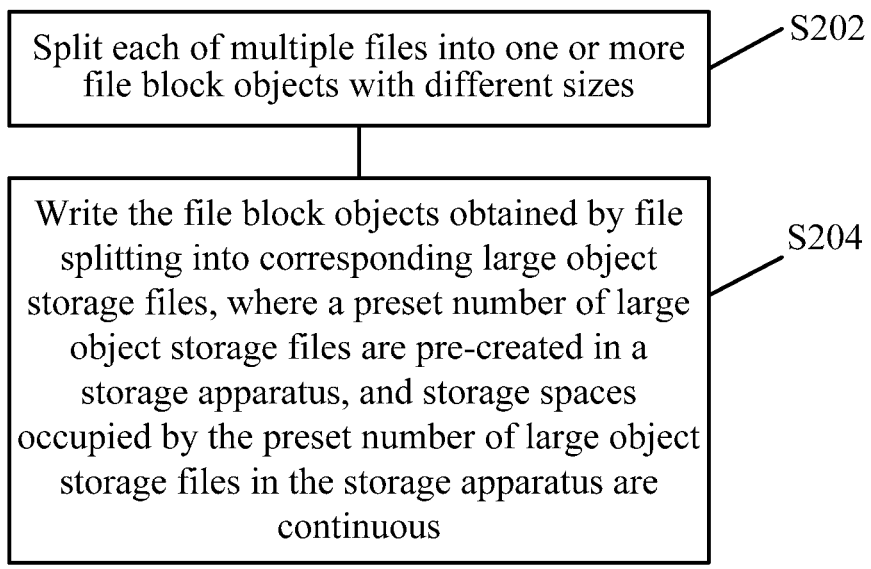
FIG. 1 is a schematic diagram of file storage in the prior art.
FIG. 2 is a flowchart of a file storage method according to Embodiment 1 of the present invention.

FIG. 2 is a flowchart of a file storage method according to Embodiment 1 of the present invention. The method includes the following steps:

Step S202: Split each of multiple (massive) files (also referred to as user files) into one or more (that is, at least one) file block objects with different sizes.

For example, according to the preset size level, each of the multiple files to be stored may be split into one or more file block objects. The size of each file block object obtained from file splitting corresponds to a size level. Obviously, if the size of a file is just equal to a size level or less than the lowest size level, the file needs no splitting.

Step S204: Write the file block objects (that is, blocks of the file) obtained from file splitting into corresponding large object storage files, where a preset number of large object storage files are pre-created in a storage apparatus, and storage spaces occupied by the preset number of large object storage files in the storage apparatus are continuous.

For example, after completion of creating the file system, preset (or fixed) number of large files (referred to as large object storage files) may be created in the storage apparatus such as hard disk, disk or partition firstly, and the storage spaces occupied by the large object storage files are continuous. That is, the total storage space of the storage apparatus is split into a preset number of continuous storage spaces, and each large object storage file occupies one of the storage spaces. Afterward, when the file system writes files, the file system writes the file block objects obtained from file splitting in step S202 (when massive files exist, the file block objects obtained from file splitting are also massive) into the corresponding large object storage files.

Steps S202-S204 above may be performed by the file system; or step S204 is performed by the file system performs only, and step S202 is performed by another apparatus or module.

In this embodiment of the present invention, a splitting and aggregation mode is applied. First, each of the massive files with different sizes is split into one or more file block objects, and then the massive file block objects obtained from file splitting are written into corresponding large object storage files pre-created in a storage apparatus such as a disk. The number of large object storage files in the storage apparatus is fixed and the storage spaces are continuous. Therefore, the massive files with different sizes are aggregated (combined) into the fixed number of large object storage files. Because the number of large object storage files in the storage apparatus is fixed and the storage spaces are continuous, the massive files with different sizes are ultimately written into fixed number of large object storage files in relative order, thereby improving the write performance of the file system in storing massive files with different sizes.

Embodiment 2

Figure 3:
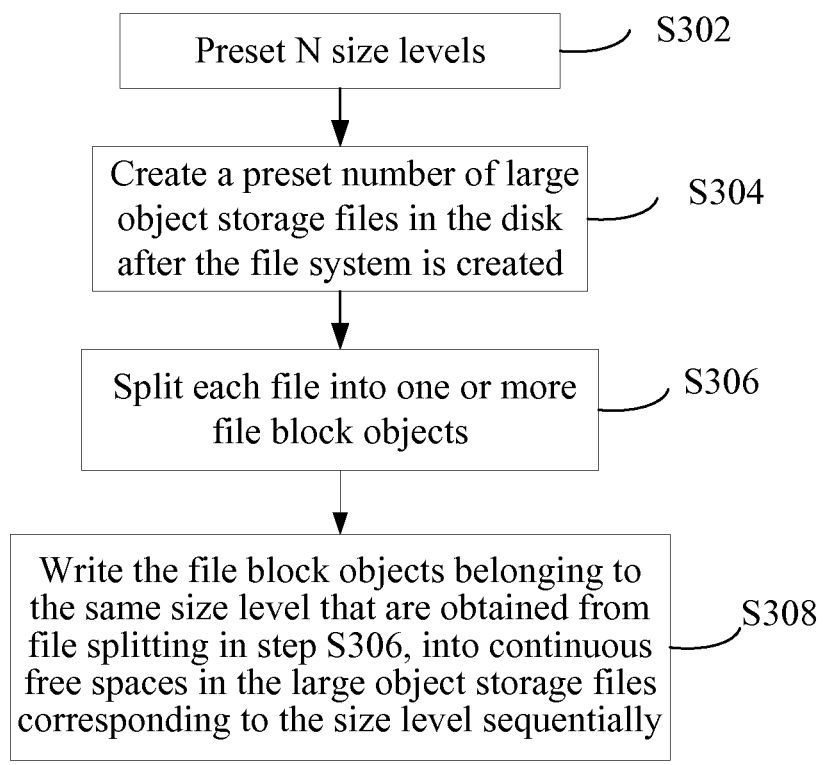
FIG. 3 is a flowchart of a file storage method according to Embodiment 2 of the present invention.

As shown in FIG. 3, a detailed processing process of a file storage method according to Embodiment 2 of the present invention may include the following steps:

Step S302: Preset N size levels, where N is a positive integer.

For example, the N size levels rank in ascending order as: $S_1KB, S_2KB, \ldots, S_CKB, P_1MB, P_2MB, \ldots, P_DMB, Q_1GB, Q_2GB, \ldots, Q_EGB, A_1TB, A_2TB, \ldots, A_FTB$, and $C+D+E+F=N$. A person skilled in the art understands that the value range of $S_1, \ldots, S_C, P_1, \ldots, P_D, Q_1, \ldots, Q_E, A_1, \ldots,$ and $A_F$ is natural number.

In practical application, N size levels may be set through two grading parameters: one is a grading range, and the other is a grading unit. The two grading parameters may be adjusted according to actual requirements to set N different size levels.

For example, first, a grading range is determined, which may be (0.1 MB), [1 MB,1 GB], [1 GB, 1 TB], or a range that is more or less. Afterward, the grading unit of each grading range is determined. For example, the grading unit of the foregoing grading range may be 1 KB, 1 MB, and 1 GB respectively, or may be finer or coarser. Therefore, in this case, N size levels rank in ascending order as: 1 KB, 2 KB, ..., 1023 KB, 1 MB, 2 MB, ..., 1023 MB, 1 GB, 2 GB, ..., 1023 GB, 1 TB, that is, $S_1=1, S_2=2, S_C=1023, P_1=1, P_2=2, P_D=1023, Q_1=1, Q_2=2, Q_E=1023, A_1=1, C=1023, D=1023, E=1023, F=1,$ and $N=3070$.

In practical application, N size levels may be set according to actual conditions and file characteristics so as to enable that more files do not need to be split, for example, to let the files to be stored be just equal to a size level or less than the lowest size level. In this way, the storage efficiency is further improved, and the resources occupied by file splitting are reduced.

Step S304: Create a file system, and then create a preset number of large object storage files in the disk, where the storage spaces occupied by the preset number of large object storage files in the disk are continuous. At this time, the preset number of large object storage files are empty.

The large object storage files may be created according to a creation method in the prior art. The storage spaces occupied by the preset number of large object storage files may be the same or different, and the size of the large object storage file is up to the size of the total storage space of the disk. Generally, in a file system, a file whose size is no more than several MB is regarded as a small file, and a file whose size is more than 10 MB is regarded as a large file. Therefore, the storage spaces occupied by the large object storage files may be more than 10 MB, or even more than 10 TB.

Obviously, to avoid waste of disk space, the preset number may be N. In this way, the N size levels set in step S302 may correspond to the N large object storage files in a one-to-one relationship.

Step S306: For each of the massive files with different sizes that need to be stored, the file is split into one or more file block objects. The size of each file block object obtained from file splitting belongs to one of the N size levels set in step S302.

For example, a file whose size is Size may be split into at most 4 file block objects whose sizes are XTB, YGB, ZMB and WKB respectively by using the following formula:

$$Size = XTB + YGB + ZMB + WKB \quad (1)$$

In the formula above, X is 0, $A_1$, $A_2$, ..., or $A_F$; Y is 0, $Q_1$, $Q_2$, ..., or $Q_E$; Z is 0, $P_1$, $P_2$, ..., or $P_D$; W is 0, $S_1$, $S_2$, ..., or $S_C$; KB represents kilobyte, MB represents megabyte, GB represents 1024 megabytes (or gigabytes), and TB represents terabyte.

Step S302 and step S306 above correspond to step S102 in FIG. 1.

Step S308: Write the file block objects belonging to the same size level that are obtained from file splitting in step S306, into continuous free spaces in the large object storage files corresponding to the size level sequentially, where the preset number is N, and the N large object storage files correspond to the N size levels in a one-to-one relationship.

After the massive files with different sizes are split in step S306, the massive file block objects are obtained. When writing the massive file block objects, the file system may write the file block objects belonging to the same size level into continuous free storage spaces in the large object storage files corresponding to the size level sequentially, that is, store each new file block object of the same level into a continuous free space in the corresponding large object storage file, and ensure sequential writing. In this way, multiple small IOs (the data amounts to be written as requested are small) may be combined into a large IO (the data amount to be written as requested is large), and the random small IOs delivered to the disk are converted into large IOs that are relatively ordered. Therefore, through increase of the IO data amount written at a time, the IO bandwidth of a single disk (that is, data amount that can be read or written at a time) is improved, and the storage (write) performance of massive files with different sizes is improved.

In Embodiment 2 above, after massive files are deleted, multiple discontinuous free spaces are left in the large object storage file. The discontinuous free spaces in the large object storage file may be combined into a continuous free space, that is, recycled and combined into a large continuous space. In addition, for each file block object stored in each large object storage file, the access frequency statistics information may be maintained. In this way, frequently accessed file block objects are stored in a centralized way, and the access speed is improved.

Embodiment 3

In step S302 in Embodiment 2, the N size levels are set in the following way:

1) Divide a file block object smaller than 1 MB into 1023 levels evenly in the unit of 1 KB. The sizes of the levels rank in ascending order as: 1 KB, 2 KB, 3 KB, 4 KB, ..., and 1023 KB.

2) For a file block object whose size is greater than 1 MB and less than 1 GB, divide the file block object into 1023 levels in the unit of 1 MB. The sizes of the levels rank in ascending order as: 1 MB, 2 MB, 3 MB, 4 MB, ..., and 1023 MB.

3) For a file block object whose size is greater than 1 GB and less than or equal to 1 TB, divide the file block object into 1024 levels in the unit of 1 GB. The sizes of the levels rank in ascending order as: 1 GB, 2 GB, 3 GB, 4 GB, ..., and 1024 GB (that is, 1 TB).

Therefore, N=1023+1023+1024=3070 size levels are supported in total, that is, the 3070 size levels rank in ascending order as: 1 KB, 2 KB, ..., 1023 KB, 1 MB, 2 MB, ..., 1023 MB, 1 GB, 2 GB, ..., 1023 GB, and 1 TB. The file system may split all files with different sizes into file block objects with different size levels first, and then store the file block objects obtained from file splitting into the large object storage files corresponding to different size levels.

Therefore, in step S306, a file whose size is Size may be split into at most 4 file block objects through formula (1). For example, the file system needs to store a file whose size is 1234567890B, that is, Size=1234567890. The specific splitting process is as follows:

Step 1: According to a 1 GB size level, remove $\lfloor 1234567890/(1024 \times 1024 \times 1024) \rfloor = 1$ GB apart from the file to form a file block object.

Step 2: From the 1234567890−1024*1024*1024=160826066 that remains after the 1 GB is removed, take $\lfloor 160826066/(1024 \times 1024) \rfloor = 153$ MB to form another file block object.

Step 3: Use the 393938/1024=384.70 KB that remains after the 1 GB and the 153 MB are taken as a file block object whose size is 385 KB.

In this way, a file whose size is 1234567890B is split into 3 file block objects whose sizes are 1 GB, 153 MB, and 385 KB respectively.

Figure 4:
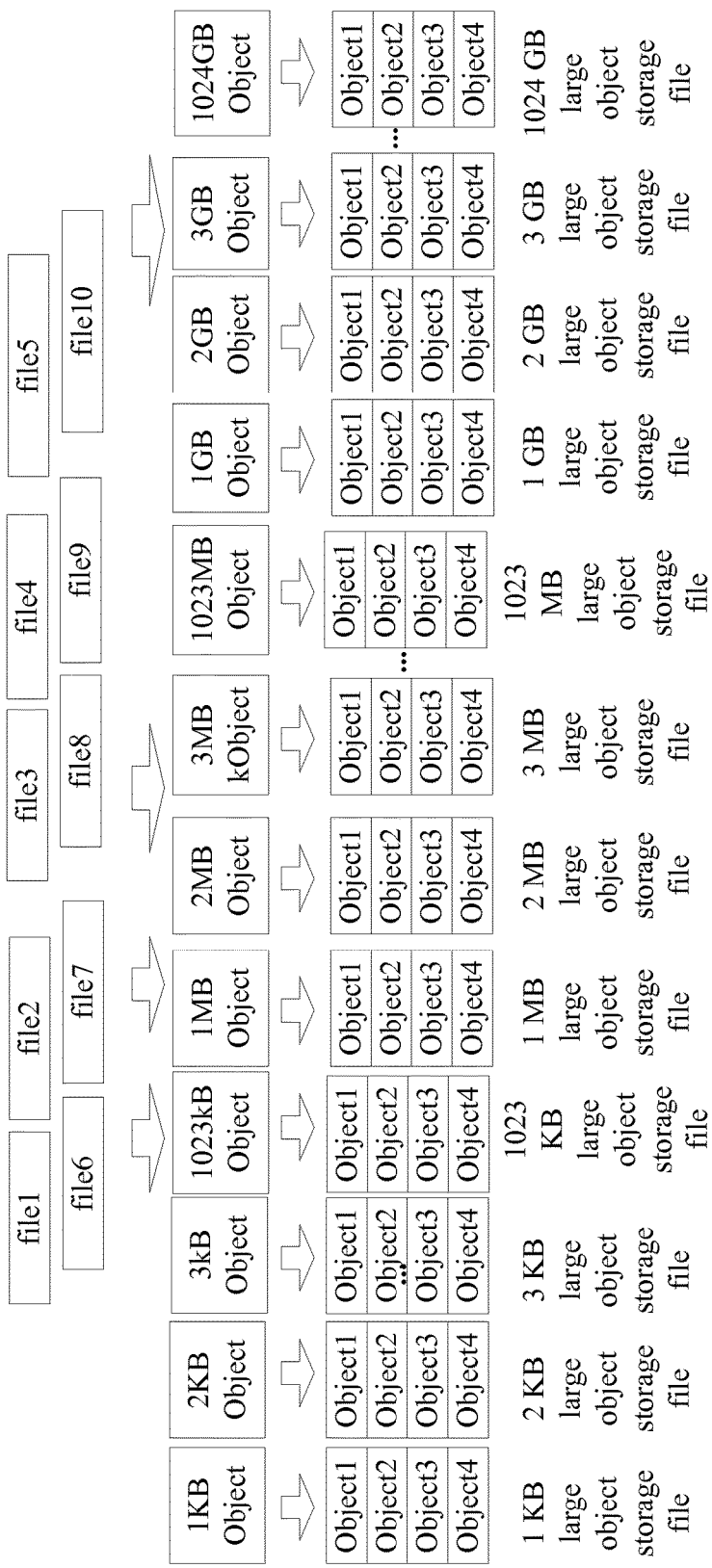
FIG. 4 is a schematic diagram of a process of writing file block objects according to Embodiment 3 of the present invention.

Subsequently, in step S308, as shown in FIG. 4, for the file block objects of a 1 KB size level in massive file block objects obtained from splitting of massive files, the file system writes them into a large object storage file corresponding to the 1 KB size level sequentially, and writes multiple file block objects of a 2 KB size level into a large object storage file corresponding to the 2 KB size level sequentially, and it is the same for other size levels. In this way, the 1 GB file block object, the 153 MB file block object, and the 385 KB file block object, which are obtained from file splitting of a 1234567890 size, can be written into the large object storage files corresponding to the 1 GB level, the 153 MB level, and the 385 KB level respectively.

Therefore, according to the technical solution in Embodiment 3 above, any file larger or smaller than 1 TB may be split into at most three file block objects of a GB level, an MB level, and a KB level respectively. Any number of files can be stored into 3070 large object storage files sequentially.

Figure 5:
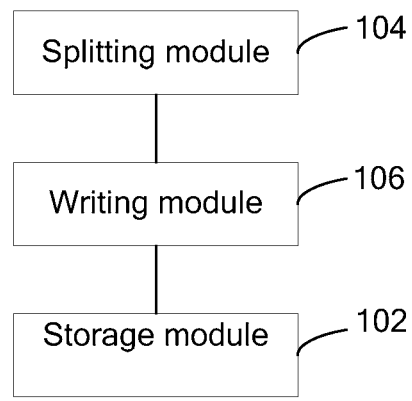
FIG. 5 is a schematic diagram of a file storage apparatus according to Embodiment 1 of the present invention.

FIG. 5 is a schematic structural diagram of a file storage apparatus according to Embodiment 1 of the present invention. The file storage apparatus includes: a storage module 102, configured to store files, where a preset number of large object storage files are pre-created in the storage module 102, and storage spaces occupied by the preset number of large object storage files in the storage module 102 are continuous; a splitting module 104, configured to split each of multiple files into one or more file block objects with different sizes; and a writing module 106, configured to write the file block objects obtained by the splitting module 104 by file splitting into corresponding large object storage files.

The storage module 102 may be, for example, a hard disk, a disk, a partition.

In this embodiment of the present invention, a splitting and aggregation mode is applied. First, the splitting module splits each of the multiple files with different sizes into one or more file block objects, and then the writing module writes the massive file block objects obtained from file splitting into corresponding large object storage files pre-created in a storage module such as a disk. The number of large object storage files in the storage module is fixed and the storage spaces are continuous. Therefore, the massive files with different sizes are aggregated (combined) into the fixed number of large object storage files. Because the number of large object storage files in the storage module is fixed and the storage spaces are continuous, the massive files with different sizes are ultimately written into a fixed number of large object storage files in relative order, thereby improving the write performance of the file system in storing massive files with different sizes.

Figure 6:
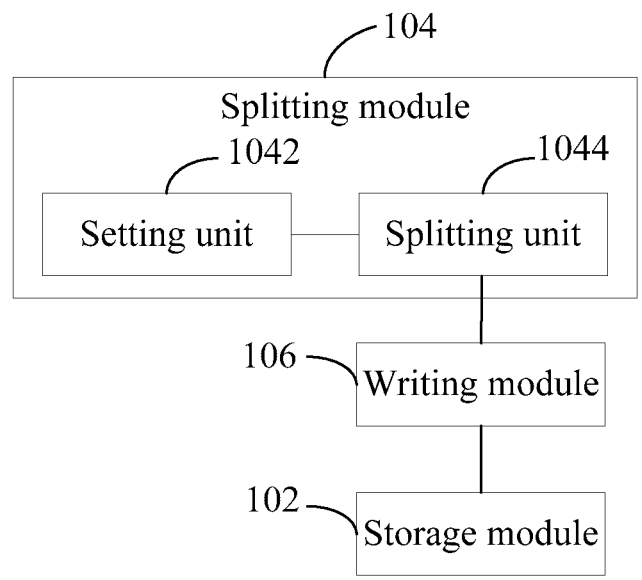
FIG. 6 is a schematic diagram of a file storage apparatus according to Embodiment 2 of the present invention.

As shown in FIG. 6, the splitting module 104 includes: a setting unit 1042, configured to preset N size levels, where N is a positive integer; and a splitting unit 1044, configured to split each file into one or more file block objects, where the size of each file block object obtained from file splitting belongs to one of the N size levels set by the setting unit 1042.

If the N size levels set by the setting unit 1042 rank in ascending order as: $S_1KB, S_2KB, \ldots, S_CKB, P_1MB, P_2MB, \ldots, P_DMB, Q_1GB, Q_2GB, \ldots, Q_EGB, A_1TB, A_2TB, \ldots, A_FTB$, where C+D+E+F=N, the splitting unit 1044 may use formula (1) to split a file whose size is Size into at most 4 file block objects whose sizes are XTB, YGB, ZMB, and WKB respectively.

In order to combine multiple small IOs into a large IO to improve the IO bandwidth, when the writing module 106 writes the multiple file block objects obtained by the splitting module 104 by file splitting into the corresponding large object storage file, the writing module may write multiple file block objects belonging to the same size level obtained from file splitting into continuous free spaces in the large object storage file corresponding to the size level sequentially, where the preset number is N, and the N large object storage files correspond to N size levels in a one-to-one relationship.

Figure 7:
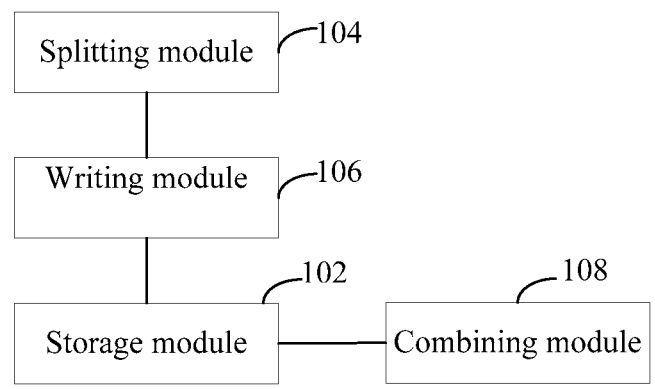
FIG. 7 is a schematic diagram of a file storage apparatus according to Embodiment 3 of the present invention.

As shown in FIG. 7, the file storage apparatus may further include: a combining module 108, configured to combine discontinuous free spaces in the large object storage file into a continuous free space if the discontinuous free spaces are generated in the large object storage file after the file is deleted, which facilitates writing of new file block objects subsequently.

The file storage apparatus in the foregoing embodiment may be a file system or a part of the file system; or, some modules in the file storage apparatus belong to the file system, and other modules belong to other apparatuses, for example, the writing module 106 and the combining module 108 belong to the file system.

The method and the apparatuses in the above embodiments of the present invention provide technical solutions to splitting and aggregating massive files with different sizes into large object storage files. First, every file is split into file block objects with different sizes, and then the file block objects are aggregated into corresponding large object storage files according to different size levels. Therefore, when the file system stores massive files with different sizes, especially massive small files, the file system may write the files into the disk by using large IOs in relative order, thereby improving the IO bandwidth of a single disk, increasing the number of accesses within a unit time, and improving the storage performance (that is, write performance) in storing massive files.

Persons of ordinary skill in the art should understand that all or a part of the processes of the method in the embodiments may be implemented by a computer program instructing relevant hardware. The program may be stored in a computer readable storage medium. When the program is run, the processes of the method in the embodiments are performed. The storage medium may be a magnetic disk, an optical disk, a read-only memory (Read-Only Memory, ROM), a random access memory (Read-Only Memory, RAM), or the like.

The foregoing descriptions are merely exemplary embodiments of the present invention, but not intended to limit the protection scope of the present invention. Any variation or replacement that can be easily made by persons skilled in the art without departing from the technical scope disclosed by the present invention shall fall within the protection scope of the present invention. Therefore, the protection scope of the present invention shall be subject to the claims.

What is claimed is:

1. A method for storing files in a storage apparatus having multiple large object storage files created in the storage apparatus, the method comprising:
respectively splitting, according to a rule Size=XTB+YGB+ZMB+WKB, each of a first file and a second file into multiple file block objects of different sizes, wherein the Size refers to a size of a file to be split, wherein X, Y, Z, and W are integers and no less than 0, wherein KB represents kilobyte, MB represents megabyte, GB represents gigabytes, and TB represents terabyte, and wherein each large object storage file is configured for storing file block objects of a predetermined size, wherein different large object storage files are configured to store file block objects with different predetermined sizes, and wherein a size of each of the multiple file blocks is equal to one of the predetermined sizes; and
writing the file block objects of the first file and the file block objects of the second file into corresponding large object storage files, wherein one of the multiple file block objects of the first file and one of the multiple file block objects of the second file are of a same first size and are written into a same large object storage file configured to store file block objects of the first size, and wherein storage spaces occupied by each of the multiple large object storage files in the storage apparatus are continuous;
wherein the splitting the first file comprises:
dividing a size of the first file by $1024^4$ to obtain the XTB of the first file;
obtaining a first remainder using the size of the first file minus the XTB of the first file;
dividing the first remainder by $1024^3$ to obtain the YGB of the first file;
obtaining a second remainder using the first remainder minus the YGB of the first file;
dividing the second remainder by $1024^2$ to obtain the ZMB of the first file;
obtaining a third remainder using the second remainder minus the ZMB of the first file; and
dividing the third remainder by 1024 to obtain the WKB of the first file; and
wherein the splitting the second file comprises:
dividing a size of the second file by $1024^4$ to obtain the XTB of the second file;
obtaining a fourth remainder using the size of the second file minus the XTB of the second file;
dividing the fourth remainder by $1024^3$ to obtain the YGB of the second file;
obtaining a fifth remainder using the fourth remainder minus the YGB of the second file;

dividing the fifth remainder by $1024^2$ to obtain the ZMB of the second file;
obtaining a sixth remainder using the fifth remainder minus the ZMB of the second file; and
dividing the sixth remainder by 1024 to obtain the WKB of the second file;
wherein a size of each of the multiple file block objects obtained from splitting belongs to one of N size levels that are preset, wherein N is a positive integer;
wherein the N size levels rank in ascending order as: $S_1KB, S_2KB, \ldots, S_CKB, P_1MB, P_2MB, \ldots, P_DMB, Q_1GB, Q_2GB, \ldots, Q_EGB, A_1TB, A_2TB, \ldots, A_FTB$, wherein $C+D+E+F=N$;
wherein each of the first file and the second file is split into at most four file block objects whose sizes are XTB, YGB, ZMB and WKB, respectively; and
wherein X is 0, $A_1, A_2, \ldots,$ or $A_F$; Y is 0, $Q_1, Q_2, \ldots,$ or $Q_F$; Z is 0, $P_1, P_2, \ldots,$ or $P_D$; W is 0, $S_1, S_2, \ldots,$ or $S_C$; and KB represents kilobytes, MB represents megabyte, GB represents gigabyte, and TB represents terabyte.

2. The method according to claim 1, wherein writing the file block objects comprises:
writing the file block objects in an order from a small size to a bigger size.

3. The method according to claim 1, wherein the predetermined sizes comprise sizes in a range of (0, 1 MB), sizes in a range of [1 MB, 1 GB), and sizes in a range of [1 GB, 1 TB].

4. The method according to claim 3, wherein the sizes in the range of (0, 1 MB) comprises one or more sizes in a unit of 1 KB, the sizes in the range of [1 MB, 1 GB) comprises one or more sizes in a unit of 1 MB, and the sizes in the range of [1 GB, 1 TB] comprises one or more sizes in a unit of 1 GB.

5. The method according to claim 1, further comprising:
combining discontinuous free spaces in one large object storage file into continuous free spaces after the file block objects stored in the large object storage file are deleted.

6. The method according to claim 1, further comprising:
writing a third file whose size is equal to a second size in the predetermined sizes into one large object storage file configured to store file block objects of the second size.

7. The method according to claim 1, further comprising:
writing a third file whose size is less than the least size of the predetermined sizes into one large object storage file configured to store file block objects with the least size.

8. A storage apparatus, comprising:
a non-transitory computer-readable medium configured to store files; and
a storage controller configured to:
create multiple large object storage files in the computer-readable medium, wherein each large object storage file is configured for storing file block objects of a predetermined size, wherein different large object storage files are configured to store file block objects with different predetermined sizes, and wherein storage spaces occupied by each of the multiple large object storage files are continuous;
respectively split, according to a rule Size=XTB+YGB+ZMB+WKB, each of a first file and a second file into multiple file block objects of different sizes, wherein the Size refers to a size of a file to be split, wherein X, Y, Z, and W are integers and no less than 0, wherein KB represents kilobyte, MB represents megabyte, GB represents gigabytes, and TB represents terabyte, and wherein a size of each of the multiple file blocks is equal to one of the predetermined sizes; and
write the file block objects of the first file and the file block objects of the second file into corresponding large object storage files, wherein one of the multiple file block objects of the first file and one of the multiple file block objects of the second file are of a same first size and are written into a same large object storage file configured to store file block objects of the first size;
wherein the splitting the first file comprises:
dividing a size of the first file by $1024^4$ to obtain the XTB of the first file;
obtaining a first remainder using the size of the first file minus the XTB of the first file;
dividing the first remainder by $1024^3$ to obtain the YGB of the first file;
obtaining a second remainder using the first remainder minus the YGB of the first file;
dividing the second remainder by $1024^2$ to obtain the ZMB of the first file;
obtaining a third remainder using the second remainder minus the ZMB of the first file; and
dividing the third remainder by 1024 to obtain the WKB of the first file; and
wherein the splitting the second file comprises:
dividing a size of the second file by $1024^4$ to obtain the XTB of the second file;
obtaining a fourth remainder using the size of the second file minus the XTB of the second file;
dividing the fourth remainder by $1024^3$ to obtain the YGB of the second file;
obtaining a fifth remainder using the fourth remainder minus the YGB of the second file;
dividing the fifth remainder by $1024^2$ to obtain the ZMB of the second file;
obtaining a sixth remainder using the fifth remainder minus the ZMB of the second file; and
dividing the sixth remainder by 1024 to obtain the WKB of the second file;
wherein a size of each of the multiple file block objects obtained from splitting belongs to one of N size levels that are preset, wherein N is a positive integer;
wherein the N size levels rank in ascending order as: $S_1KB, S_2KB, \ldots, S_CKB, P_1MB, P_2MB, \ldots, P_DMB, Q_1GB, Q_2\,GB, \ldots, Q_EGB, A_1TB, A_2\,TB, \ldots, A_FTB$, wherein $C+D+E+F=N$;
wherein each of the first file and the second file is split into at most four file block objects whose sizes are XTB, YGB, ZMB and WKB, respectively; and
wherein X is 0, $A_1, A_2, \ldots,$ or $A_F$; Y is 0, $Q_1, Q_2, \ldots,$ or $Q_E$; Z is 0, $P_1, P_2, \ldots,$ or $P_D$; W is 0, $S_1, S_2, \ldots,$ or $S_C$; and KB represents kilobytes, MB represents megabyte, GB represents gigabyte, and TB represents terabyte.

9. The storage apparatus according to claim 8, wherein the storage controller is further configured to write the file block objects in a sequence from a small size to a bigger size.

10. The storage apparatus according to claim 8, wherein the predetermined sizes comprise sizes in a range of (0, 1 MB), sizes in a range of [1 MB, 1 GB), and sizes in a range of [1 GB, 1 TB].

11. The storage apparatus according to claim 10, wherein the sizes in the range of (0, 1 MB) comprises one or more sizes in a unit of 1 KB, the sizes in the range of [1 MB, 1 GB) comprises one or more sizes in a unit of 1 MB, and the sizes in the range of [1 GB, 1 TB] comprises one or more sizes in a unit of 1 GB.

12. The storage apparatus according to claim 8, wherein the storage controller is further configured to combine discontinuous free spaces in one large object storage file into continuous free spaces after the file block objects stored in the large object storage file are deleted.

13. The storage apparatus according to claim 8, wherein the storage controller is further configured to write a third file whose size is equal to a second size in the predetermined sizes into one large object storage file configured to store file block objects of the second size.

14. The storage apparatus according to claim 8, wherein the storage controller is further configured to write a third file whose size is less than the least size of the predetermined sizes into one large object storage file configured to store file block objects with the least size.

* * * * *